United States Patent
Liskar (10) Patent No.: US 11,225,885 B2
(45) Date of Patent: Jan. 18, 2022

(54) ROCKER ARM MOTION DETECTION FOR DIAGNOSTIC FEEDBACK AND CONTROL

(71) Applicant: Eaton Intelligent Power Limited, Dublin (IE)

(72) Inventor: Petr Liskar, Prague (CZ)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/635,062

(22) PCT Filed: Jul. 30, 2018

(86) PCT No.: PCT/US2018/044304
§ 371 (c)(1),
(2) Date: Jan. 29, 2020

(87) PCT Pub. No.: WO2019/027867
PCT Pub. Date: Feb. 7, 2019

(65) Prior Publication Data
US 2021/0095580 A1    Apr. 1, 2021

Related U.S. Application Data

(60) Provisional application No. 62/539,611, filed on Aug. 1, 2017.

(51) Int. Cl.
| | |
|---|---|
| *F01L 1/18* | (2006.01) |
| *F01L 1/22* | (2006.01) |
| *F01L 1/047* | (2006.01) |
| *F01L 3/06* | (2006.01) |

(Continued)

(52) U.S. Cl.
CPC .................. *F01L 1/22* (2013.01); *F01L 1/047* (2013.01); *F01L 1/18* (2013.01); *F01L 3/06* (2013.01); *F01L 13/0005* (2013.01); *F02D 41/22* (2013.01); *F01L 2201/00* (2013.01);

(Continued)

(58) Field of Classification Search
CPC ..... F01L 1/22; F01L 1/18; F01L 1/047; F01L 13/0005; F01L 3/06; F01L 2305/00; F01L 2301/00; F01L 2820/045; F02D 41/22
See application file for complete search history.

(56) References Cited

FOREIGN PATENT DOCUMENTS

| | | | | |
|---|---|---|---|---|
| EP | | 0391267 A1 * | 10/1990 | ........... H01C 10/308 |
| WO | WO 2016/197088 | | 12/2016 | |
| WO | WO 2017/091799 | | 1/2017 | |

OTHER PUBLICATIONS

Abstract of EP-0391267-A1 above; Halder Ernst, Oct. 1990.*

* cited by examiner

*Primary Examiner* — Zelalem Eshete
(74) *Attorney, Agent, or Firm* — Paul V. Keller (57) ABSTRACT

A method of operating an internal combustion engine having an electrical circuit that includes a connection closed by abutment between two distinct parts, one of which is mounted to a rocker arm of a rocker arm assembly and another that is mounted to a part distinct from the rocker arm. The connection is structured such that the movement of the rocker arm causes relative motion between the surfaces of the distinct parts that close the connection. The relative motion causes the circuit resistance to transition between values within a first range and values within a second range. The transitions of resistance between those ranges are detected and their presence, absence, or timing used for purposes of providing diagnostic feedback or control.

20 Claims, 7 Drawing Sheets

(51) Int. Cl.
*F01L 13/00* (2006.01)
*F02D 41/22* (2006.01)
(52) U.S. Cl.
CPC ....... *F01L 2301/00* (2020.05); *F01L 2305/00* (2020.05); *F01L 2820/045* (2013.01)

ROCKER ARM MOTION DETECTION FOR DIAGNOSTIC FEEDBACK AND CONTROL

FIELD

The present teachings relate to valvetrains, particularly valvetrains providing variable valve lift (VVL) or cylinder deactivation (CDA).

BACKGROUND

Hydraulically actuated latches are used on some rocker arm assemblies to implement variable valve lift (VVL) or cylinder deactivation (CDA). For example, some switching roller finger followers (SRFF) use hydraulically actuated latches. In these systems, pressurized oil from an oil pump may be used for latch actuation. The flow of pressurized oil may be regulated by an oil control valve (OCV) under the supervision of an engine control unit (ECU). A separate feed from the same source provides oil for hydraulic lash adjustment. In these systems, each rocker arm assembly has two hydraulic feeds, which entails a degree of complexity and equipment cost. The oil demands of these hydraulic feeds may approach the limits of existing supply systems.

The complexity and demands for oil in some valvetrain systems can be reduced by replacing hydraulically latched rocker arm assemblies with electrically latched rocker arm assemblies. Accordingly, there has long been an interest in electric latches for rocker arm assemblies. In addition, regardless of whether the latches are electrically or hydraulically actuated, there has been a long felt need to provide on board diagnostic systems that report whether the latches are operating as intended.

SUMMARY

The present teachings relate to a method of operating an internal combustion engine of a type that has a combustion chamber, a moveable valve having a seat formed in the combustion chamber, a camshaft, and a rocker arm assembly that actuates the valve and includes a rocker arm and a cam follower configured to engage a cam mounted on the camshaft as the camshaft rotates. The rocker arm assembly is configured such that rotation of the camshaft is operative to transmit force from the cam to the cam follower and move the rocker arm.

In accordance with some aspects of the present teachings, the engine further includes an electrical circuit having an electrical connection made by abutment between two distinct parts, one of which is mounted to the rocker arm. In accordance with these teaching, the connection is structured such that the movement of the rocker arm causes relative motion between contacting surfaces of the abutting parts. The relative motion causes the circuit resistance to transition between values within a first range and values within a second range. The change in resistance may relate to a shifting of the region of contact from one location on the surface of one or the parts to another location on the surface of that part. In some of these teachings, one of the abutting parts is partially covered with a coating that causes the transition in circuit resistance. In some of these teachings, that coating include diamond-like carbon (DLC). In some of these teachings, the circuit includes a connection to ground that is made through the structure of the rocker arm assembly.

In some aspects of the present teachings, the rocker arm assembly includes a latch pin translatable between a first position and a second position. One of the first and second latch pin positions provides a configuration in which the rocker arm assembly is operative to actuate the moveable valve in response to actuation of the cam follower by the cam to produce a first valve lift profile. The other of the first and second latch pin positions provides a configuration in which the rocker arm assembly is operative to actuate the moveable valve in response to actuation by the cam follower by the cam to produce a second valve lift profile, which is distinct from the first valve lift profile, or the moveable valve is deactivated. This structure may provide cylinder deactivation (CDA) or variable valve lift (VVL). In some of these teaching, the latch pin is actuated by an electromagnet that is powered through the electrical connection. In some of these teaching, the latch pin is part of an electromagnetic latch assembly that renders the latch pin stable independently from the electromagnet in both the first and the second positions.

The method includes collecting data over an interval and determining any time over that interval at which the circuit resistance transitions between a first value range and a second value range. In some of these teachings, the method includes determining first and second times at which the circuit resistance transitions between the two ranges. In some of these teachings, both the first and the second transition times are times at which the resistance transitions from the first range to the second. The interval between those transition times may be used to determine the camshaft rotation rate. The engine may be controlled with reference to the camshaft rotation rate determined in that manner. In some others of these teachings, the first transition time is a time of transition from the first range to the second and the second transition time is a time of transition from the second range to the first. The interval between those transitions may be used to determine the valve lift profile. Diagnostic feedback may be provide based on that valve lift profile determination.

In some of these teachings, the absence of any transitions over the data collection interval is used to provide diagnostic feedback or control. In some of these teachings, if there are no transitions over the sampling interval and the resistance is checked to see whether it remained within an expected range. If it did not, a fault may be reported. In some of these teachings, it is determined whether the resistance exceeded a critical maximum during the interval. If it did, a possible open circuit may be reported. In some of these teachings, it is determined whether the resistance exceeded a critical minimum during the interval. If it did, a possible short circuit may be reported.

According to some aspects of the present teachings, an electromagnetic latch assembly mounted to the rocker arm is powered through the electrical connection. In some of these teachings, the resistance measurements are made while powering the circuit without actuating the latch. In some of these teaching, the measurements are made while powering the circuit with a current 50% or less that required to actuate the latch. The current may be maintained for a period of at least one cam cycle. In some of these teachings, the circuit is pulsed to measure the resistance. In some of these teachings, the resistance is measured over a series of discrete times and the points of transitions are estimated based on the data.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

FIGS. 1-4 illustrates a valvetrain 100 with rocker arm assemblies 106. Rocker arm assemblies 106 each include two rocker arms, an outer arm 103A and an inner arm 103B, and cam followers 110. Valvetrain 100 is suitable for an internal combustion engine of a type that has combustion chambers, moveable valves having seats formed in the combustion chambers, and a camshaft. Rocker arm assemblies 106 may be installed in such an engine on pivots 140 in a configuration in which cams (not shown) on the camshaft engage cam followers 110 as the camshaft rotates. The action of the cams on cam followers 110 is operative to actuate inner arms 103B. If outer arms 103A are also actuated, the moveable valves may be opened and closed.

Figure 1:
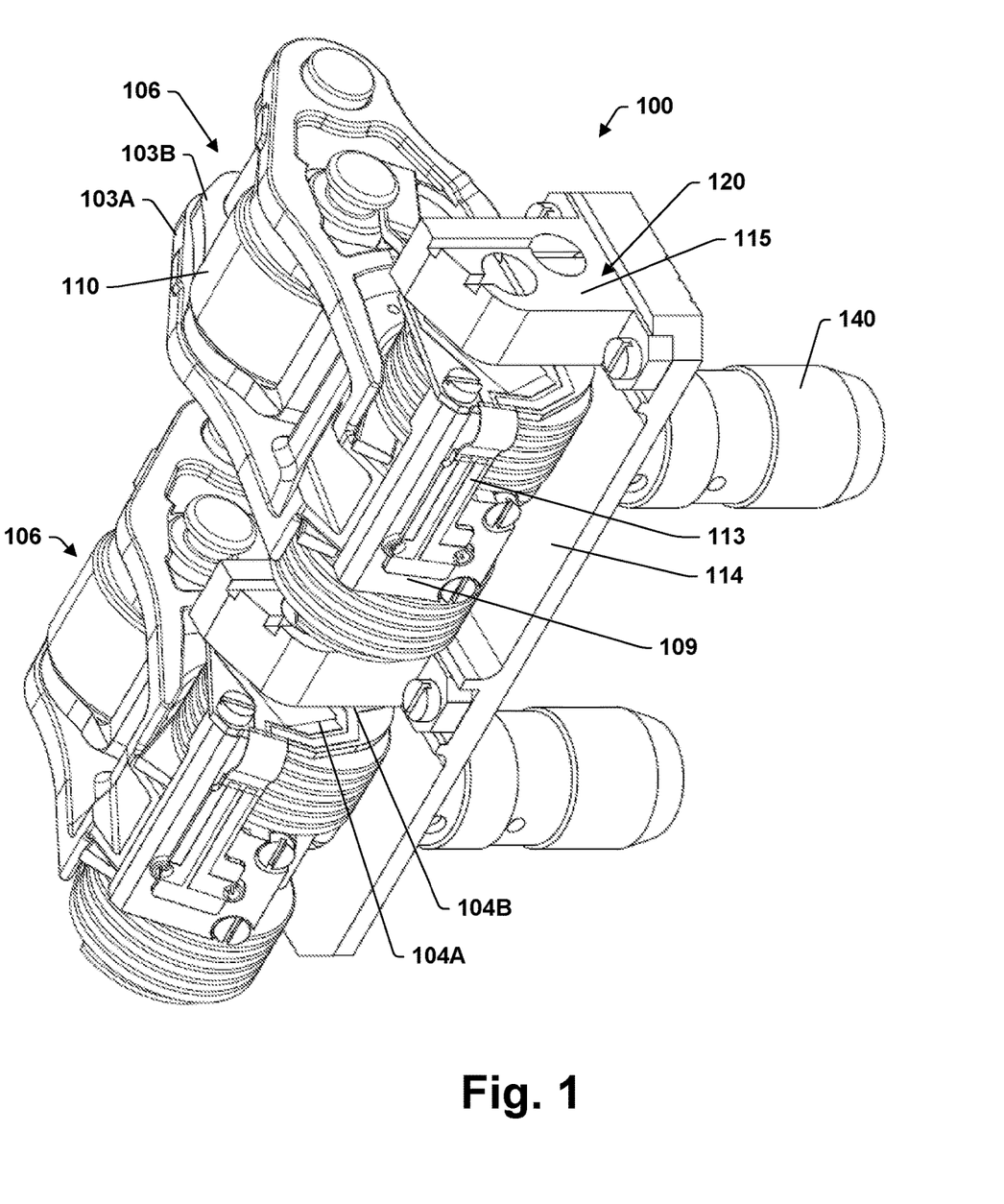
FIG. 1 is a perspective view of a portion of a valvetrain according to some aspects of the present teachings.
Figure 2:
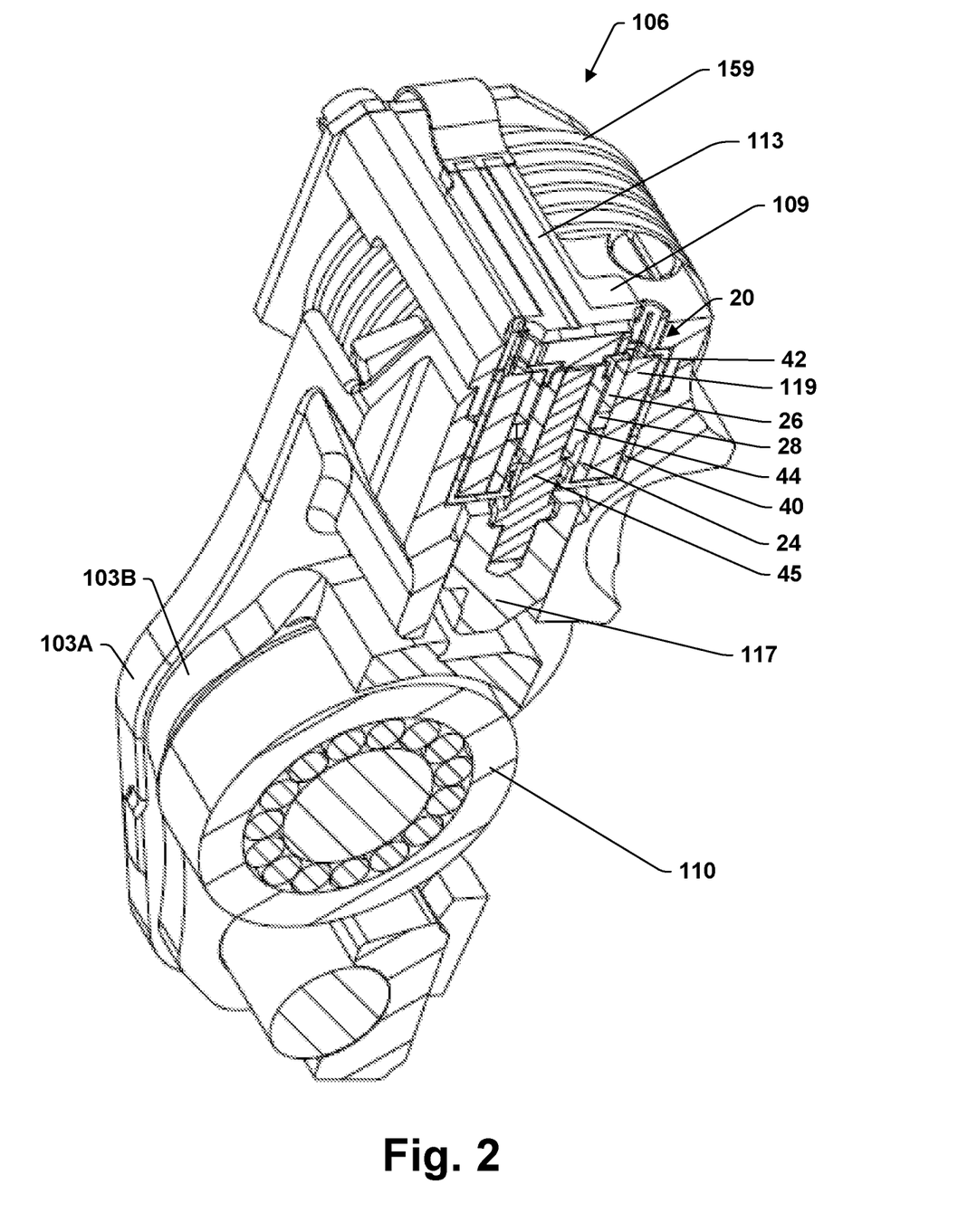
FIG. 2 is a perspective view of showing a cross-section of one of the rocker arm assemblies in the valvetrain of FIG. 1.

Rocker arm assemblies 106 may be cylinder deactivating rocker arms. With reference to FIG. 2, cylinder deactivation is controlled by electromagnetic latch assemblies 20, one of which is mounted to each of rocker arm assemblies 106. Electromagnetic latch assemblies 20 each include a latch pin 117 that has extended and retracted positions. FIG. 2 shows latch pin 117 in the retracted position. When latch pin 117 is in the retracted position, rocker arms 103A and 1036 are in a disengaged configuration. In the disengaged configuration, outer arm 103A may remain stationary even as inner arm 1036 is driven to pivot through cam follower 110. In this configuration, a valve actuated by rocker arm assembly 106 may be disabled. Latch pin 117 may be extended to place rocker arms 103A and 103B in an engaging configuration. In the engaging configuration, outer arm 103A may pivot in conjunction with inner arm 103B and a valve actuated by rocker arm assembly 106 may open and close in conjunction with actuation of rocker arm assembly 106 through cam follower 110. Providing additional cams that operate directly on outer arm 103A can convert rocker arm assembly 106 into a two-step rocker arm providing two alternative valve lift profiles.

Figure 5:
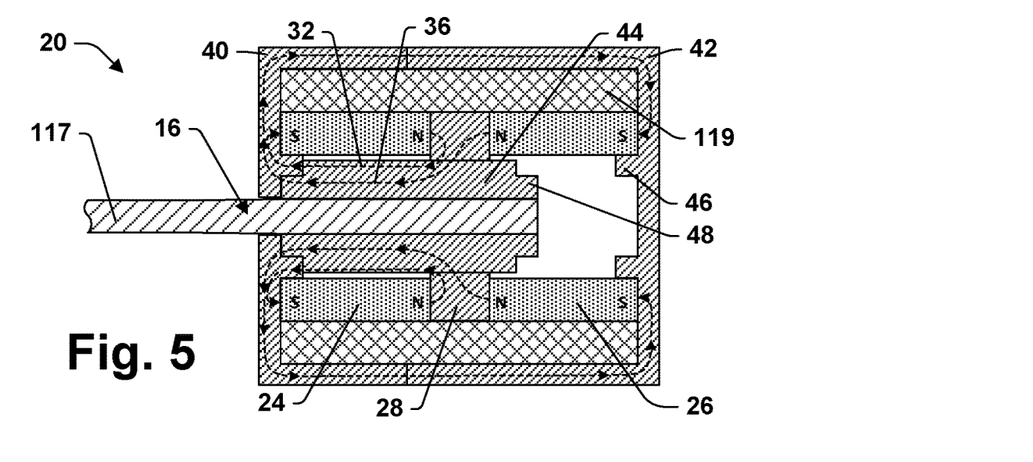
FIG. 5 is a cross-section side view of an electromagnetic latch assembly according to some aspects of the present teachings with the latch pin in an extended position.
Figure 6:
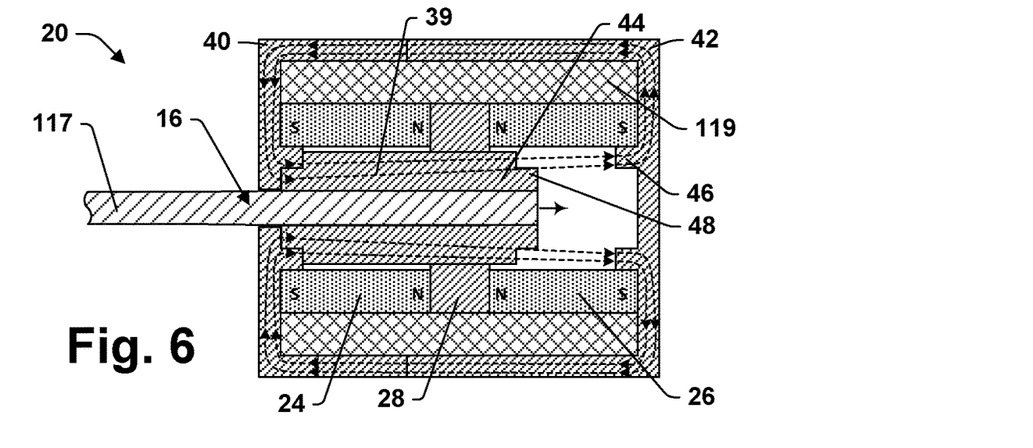
FIG. 6 provides the same view as FIG. 5, but illustrating a magnetic flux that may be generated by the coil.
Figure 7:
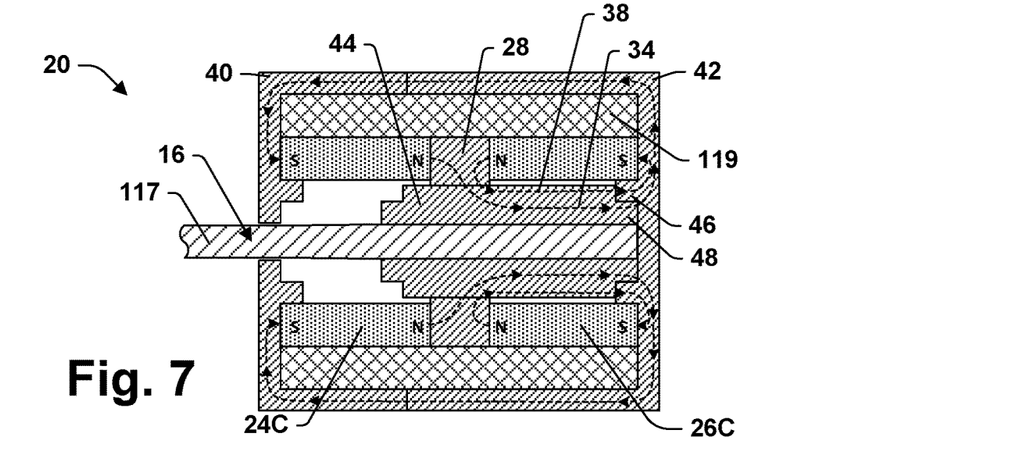
FIG. 7 provides the view of FIG. 5 but with the latch pin in a retracted position.

Electromagnetic latch assembly 20 includes permanent magnets 24 and 26, and an electromagnet 119, which is operative to actuate latch pin 117 between the extended and retracted positions. The operation of these components is illustrated by the sketches of FIGS. 5-7. FIG. 5 illustrates electromagnetic latch assembly 20 with latch pin 117 in the extended position, which is a first limit of travel for latch pin 117. FIG. 7 illustrates electromagnetic latch assembly 20 with latch pin 117 in the retracted position, which is a second limit of travel for latch pin 117. Electromagnet 119 is operative to cause latch pin 117 to translate between the extended and retracted positions. FIG. 6 illustrates the magnet field generated by electromagnet 119 to initiate the transition between the extended and retracted positions.

Permanent magnets 24 and 26 are each operative to stabilize the position of latch pin 117 in each of the extended and retracted positions. As illustrated in FIGS. 5 and 7, permanent magnets 24 and 26 utilize different magnetic circuits depending on whether latch pin 117 is in the extended or the retracted position. Pole pieces 40 and 42 form a clam shell around electromagnet 119, which completes some of these magnetic circuits. Latch pin 117 has a magnetically susceptible ferrule 44 around a paramagnetic core 45. Ferrule 44 is within these magnetic circuits and is the part through which permanent magnets 24 and 26 exert forces on latch pin 117. Magnetic circuits have characteristics as described herein, but it should be appreciated that the illustrations of these circuits are only approximate.

For the purposes of this disclosure, a paramagnetic material is one that does not interaction strongly with magnetic fields. Aluminum is an example of a paramagnetic material. A magnetically susceptible material is generally a low coercivity ferromagnetic material. Soft iron is an example of a low coercivity ferromagnetic material. Pole pieces 28, 40, and 42 and ferrule 44 may all be made from soft iron.

As shown in FIG. 5, magnetic circuit 32 is the primary path for an operative portion of the magnet flux from magnet 24 when latch pin 117 is in the extended position, absent magnetic fields from electromagnet 119 or any external source that might alter the path taken by flux from magnet 24. The operative portion of the flux is that portion of the magnetic flux which contributes to the stability of latch pin 117 in its current position. Magnetic circuit 32 proceeds from the north pole of magnet 24, through pole piece 28, through ferrule 44, through an edge of pole piece 40, and ends at the south pole of magnet 24. Perturbation of latch pin 117 from the extended position would introduce an air gap into magnetic circuit 32, increasing its magnetic reluctance. The magnetic forces produced by magnet 24 resist such perturbations.

As shown in FIG. 7, when latch pin 117 is in the retracted position, magnetic circuit 34 becomes the primary path for an operative portion of the magnet flux from magnet 24. Magnetic circuit 34 proceeds from the north pole of magnet 24, through pole piece 28, through ferrule 44, through pole piece 42, through pole pieces 40, and ends at the south pole of magnet 24. Perturbations of latch pin 117 from the retracted position would introduce an air gap into magnetic circuit 34, increasing its magnetic reluctance. The magnetic forces produced by magnet 24 resist such perturbations.

Magnet 26 is also operative to stabilize latch pin 117 in both the extended and retracted positions. As shown in FIGS. 5 and 7, magnetic circuit 36 is the primary path for an operative portion of the magnet flux from magnet 26 when latch pin 117 is in the extended position and magnetic circuit 38 is the primary path for an operative portion of the magnet flux from magnet 26 when latch pin 117 is in the retracted position.

Magnetic circuits 34 and 36 pass through portions of pole pieces 40 and/or 42 that are outside the perimeter of electromagnet 119. Magnetic circuits 32 and 38 do not. Magnetic circuits 32 and 38 are comparatively short resulting in low magnetic flux leakage and a high holding force for latch pin 117. Having one of these circuits active for each of the extended and retracted positions helps ensure that latch pin 117 is securely held.

Electromagnetic latch assembly 20 is structured to operate through a magnetic flux shifting mechanism. In accordance with the flux shifting mechanism, electromagnet 119 is operable to alter the path taken by flux from permanent magnets 24 and 26. FIG. 6 illustrates the mechanism for this action in the case of operating electromagnet 119 to induce latch pin 117 to actuate from the extended position to the retracted position. A voltage of suitable polarity may be applied to electromagnet 119 to induce magnetic flux following the circuit 39. This magnetic flux reverses magnetic polarities in ferrule 44 and pole pieces 40 and 42. This greatly increase the reluctance of magnetic circuits 32 and 36 causing flux following those circuits to shift toward magnetic circuits 34 and 38. The net magnetic forces on latch pin 117 may drive it to the retracted position shown in FIG. 7. Notably, the total air gap in the magnetic circuit 39 taken by flux from electromagnet 119 does not vary as latch pin 117 actuates. This feature relates to operability through a flux shifting mechanism.

A consequence of the flux shifting mechanism is that electromagnetic latch assembly 20 does not need to do work on latch pin 117 throughout its traverse from the extended position to the retracted position or vis-versa. While permanent magnets 24 and 26 may initially holds latch pin 117 in the extended position, at some point during latch pin 117's progress toward the retracted position permanent magnets 24 and 26 begins to attraction latch pin 117 toward the retracted position.

Ferrule 44 has a stepped edge 48 that mates with a stepped edge 46 of pole piece 42 as latch pin 117 moves into the retracted position. As shown in FIG. 6, when electromagnet 119 is operated to actuate latch pin 117 from the extended position to the retracted position magnetic flux generated by electromagnet 119 crosses between stepped edge 48 and stepped edge 46. As shown in FIG. 5, magnetic flux from permanent magnets 24 and 26 also crosses between stepped edges 46 and 48 when the flux from these magnets follows magnetic circuits 34 and 38. Forming these mating surfaces with stepped edges 46 and 48 increases the magnitude of the magnetic forces that draw latch pin 117 into the retracted position over a range of latch pin travel.

Figure 3:
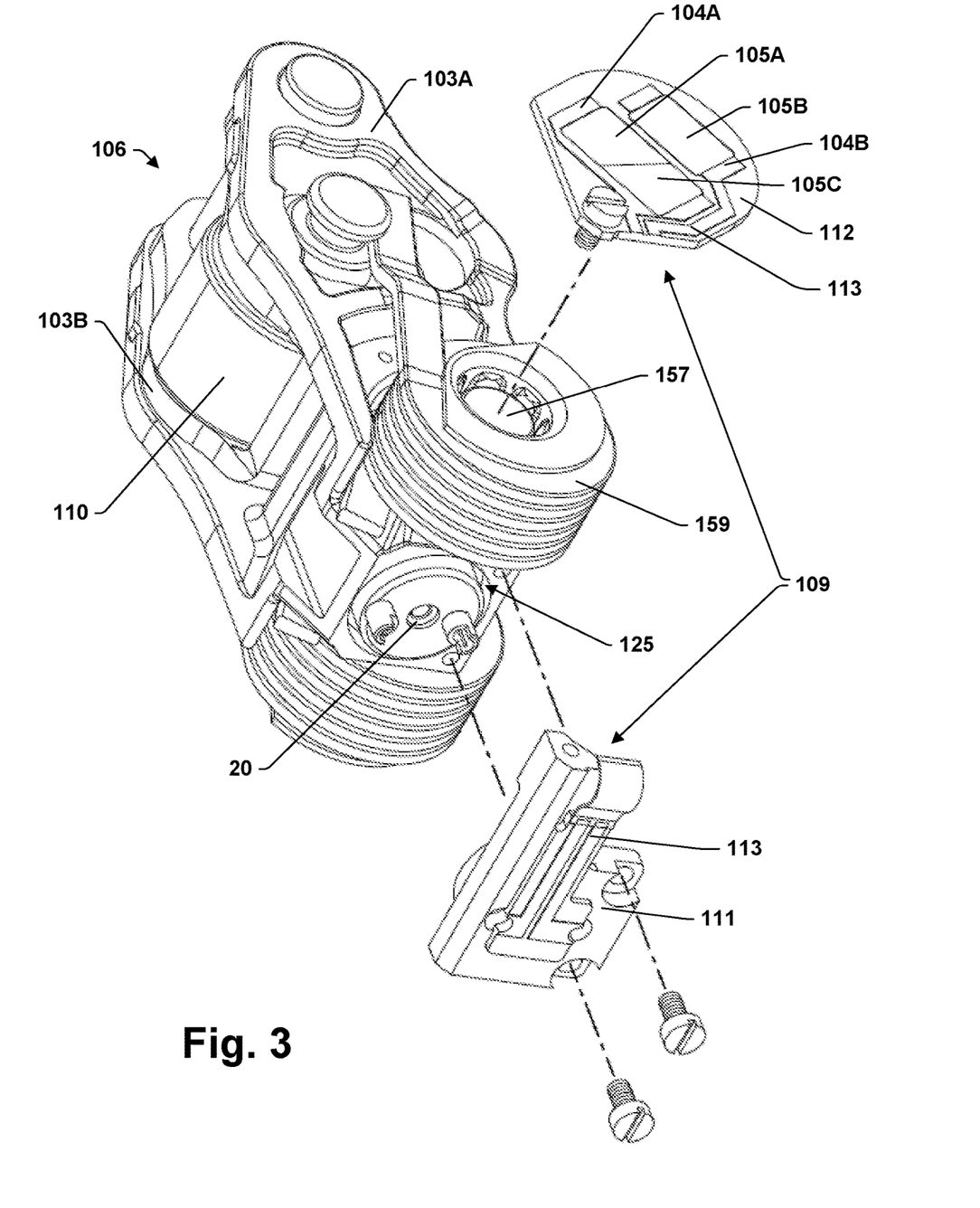
FIG. 3 is a partially exploded view illustrating the way in which contact pads are mounted to the rocker arm assembly of FIG. 2.

Referring to FIGS. 2 and 3, electromagnetic latch assembly 20 may be installed in outer arm 103A through opening 125 at the back of rocker arms 103A. Electromagnet 119 is powered through contacts pads 104A and 104B. Bracket 109, which may be press fit into opening 125, mounts contacts pads 104A and 104B to outer arm 103A and holds contacts pads 104A and 104B to one side of outer arm 103A over spring post 157. Bracket 119 also supports wires 113, which couple electromagnet 119 to contacts pads 104A and 104B. Bracket 109 may include a part 111 held at the back of outer arm 103A and a part 112 held to the side of outer arm 103A. Optionally, parts 111 and 112 are provided as a single part. Such a part may be formed by over-molding wires 113 and contacts pads 104A and 104B.

Figure 4:
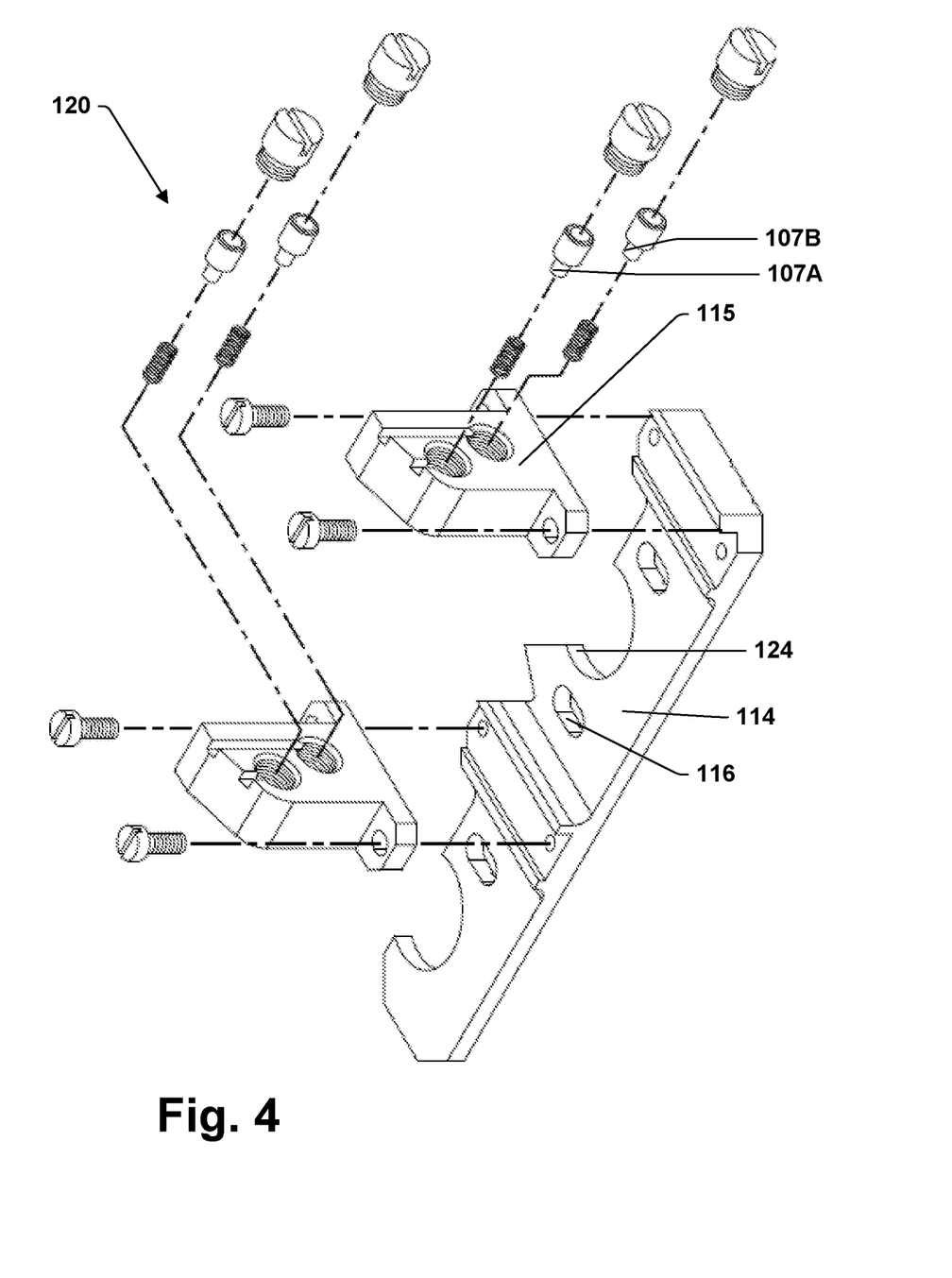
FIG. 4 is an exploded view of a mounting frame for spring-loaded contact pins that is part of the valvetrain of FIG. 1.

Electromagnet 119 is powered through electrical connections 102A and 102B, which are formed by abutment between spring-loaded pins 107A and 107B and contact pads 104A and 104B. Contact pads 104A and 104B are mounted to outer arm 103A and move in conjunction with outer arm 103A. Spring-loaded pins 107A and 107B are mounted to components distinct from rocker arm assembly 106, whereby outer arm 103A moves independently from spring-loaded pins 107A and 107B. Spring-loaded pins 107A and 107B are held against contact pads 104A and 104B respectively by framework 120. As shown in FIG. 4, framework 120 may include a base plate 114 and slip ring towers 115. Base plate 114 may include cutouts 124 that fit around pivots 140. When framework 120 is installed in an engine, baseplate 114 may rest atop a cylinder head (not shown) and abut two pivots 140. Cutouts 124 may cooperate with pivots 140 to ensure proper positioning of framework 120 with respect to rocker arm assemblies 106 and therefore proper position of spring-loaded pins 107 with respect to contact pads 104. Framework 120 may be secured to the cylinder head by bolts passing through openings 116. This structure holds spring-loaded pins 107 stationary relative to the cylinder head even as contact pads 104 pivot in relation to the movement of outer arm 103A.

With reference to FIG. 3, contact pads 104A and 104B have planar contact surfaces 105A and 105B respectively. Each rocker arm assembly 106 pivots on a pivot 140, which may be a hydraulic lash adjuster. Outer arm 103A and inner arm 103B are free to pivot relative to one-another except when they are engaged by latch pin 117. Pivot 140 may raise or lower rocker arm assembly 106 to adjust lash. These motions take outer arm 103A in directions parallel to the plane in which the planar contact surfaces contact pads 104A and 104B are oriented. Accordingly, the electrical connections 102 formed by abutment between contacts pads 104 and spring-loaded pins 107 may be maintained as outer arm 103A goes through its range of motion.

Spring-loaded pin 107B may remain in abutment with contact surface 105B throughout outer arm 103A's range of motion. Spring-loaded pin 107A may remain in abutment with contact surface 105A through only a portion of outer arm 103A's range of motion. Contact pad 104A may be structured and positioned such that as outer arm 103A is lifted off base circle, spring-loaded pin 107A moved from abutment with contact surface 105A to abutment with contact surface 105C. Connection through contact surface 105C may present a distinctly higher resistance than connection through contact surface 105A. The difference in resistance may be used to detect the position of outer arm 103A.

The higher resistance may be essentially infinite. In one example, the higher resistance is created by scoring contact pad 104A to divide surfaces 105A and 105C, whereby only surface 105A is coupled to wires 113. Preferably, the higher resistance is less than infinite whereby connection through surface 105C may be distinguished from an open circuit. In some of these teachings, the higher resistance is two to 1000 times higher. Most preferably, the higher resistance is 5 to 500 times higher. In an example of the present disclosure, the resistance that is higher, but not infinite, is provided by a coating on contact surface 105C that is not present on contact surface 105A. That coating may be a diamond-like carbon (DLC) coating.

Any suitable structure may be used to mount contact pads 104 to outer arm 103A. Likewise, spring-loaded pins 107 could be mounted to any suitable part that is distinct from outer arm 103A. Spring-loaded pins 107 may be mounted to that distinct part by any suitable structure. Contact pads 104 may be the parts mounted to components distinct from outer arm 103A while spring-loaded pins 107 may be mounted to outer arm 103A. Pins 107 could be simple pins without springs. Contact pads 104 could be formed with leaf springs to bias pins 107 and contact pads 104 into abutment. Suitable contacts could also be formed with rollers or motor brushes. The structure being sought is one in which one of the abutting surfaces form the electrical connection 102 rolls or slides relative to the other in relation to outer arm 103A being lifted by a cam.

Electromagnet 119 is powered by circuitry that allows electromagnet 119 to be powered with DC current in either a forward or a reverse direction. A conventional solenoid switch forms a magnetic circuit that include an air gap, a spring that tends to enlarge the air gap, and an armature moveable to reduce the air gap. Moving the armature to reduce the air gap reduces the magnetic reluctance of that circuit. Consequently, energizing a conventional solenoid switch causes the armature to move in the direction that reduces the air gap regardless of the direction of the current through the solenoid's coil or the polarity of the resulting magnetic field. As described above, however, latch pin 117 may be moved in either one direction or another depending on the polarity of the magnetic field generated by electromagnet 119. Circuitry, an H-bridge for example, allows the polarity of the applied voltage to be reversed and enables electromagnetic latch assembly 20 to actuate latch pin 117 to either the extend or the retracted position.

Figure 8:
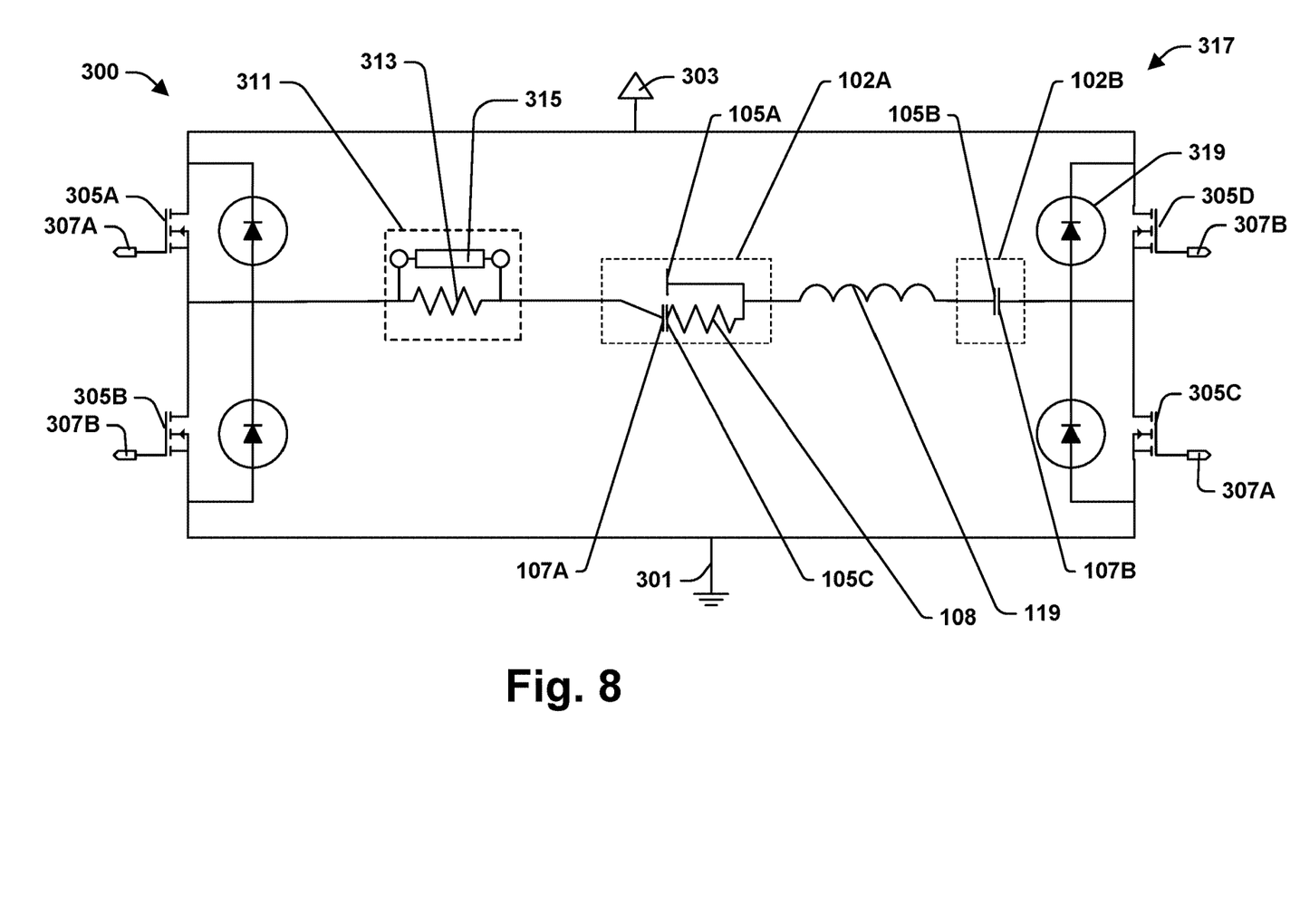
FIG. 8 provides a circuit diagram in accordance with some aspects of the present teachings.

FIG. 8 provides a drawing of a circuit 300 through which electromagnet 119 may be powered. Circuit 300 includes current sensor 311, H-bridge 317, and electromagnet 119. H-bridge 317 may be controlled through signal 307A and 307B. Signal 307A closes switches 305A and 305C allowing current from voltage source 303 to flow through electromagnet 119 in a first direction to ground 301. Signal 307B closes switches 305B and 305D allowing current from voltage source 303 to flow through electromagnet 119 in a second direction, which is the reverse of the first direction, to ground 301. Signals 307A and 307B may be provided by a controller (not shown).

Circuit 300 includes two connections 102 made abutment between surfaces that may undergo relative motion in conjunction with movement of outer arm 103A. Connection 102A may be formed by abutment between pin 107A and either contact surface 105A or contact surface 105C. When connection 102A is closed through contact with surface 105C, a significant resistance 108 is introduced into the circuit. When the connection 102A is closed through contact surface 105A, the resistance 108 is avoided. Sensor 311 provides measurements that determine whether the current to electromagnet 119 is being limited by the resistance 108. Sensor 311 may be a current sensor that includes a shunt resistor 313 and a voltage measuring device 315 connected across shunt resistor 313. Sensor 311 may alternatively be a Hall effect sensor or any other suitable type of current sensor.

An alternative to circuit 300 is one that selectively provides current at potentials either above or below ground to pin 107A, eliminating the need for H-bridge 317 and electrical connection 102B. In this scenario, wiring to contact pad 104B may be replaced with a connection to ground. The connection to ground may be made through the structure of rocker arm assembly 106. In addition, it should be appreciated that the methods of the present disclosure are suitable for use with rocker arm assemblies that do not have electronic devices on them and to rocker arm assemblies that are neither switching or cylinder deactivating. Accordingly, circuitry to selectively provide either forward or reverse DC current is not essential and contact pad 104A may connect directly to ground. The part of circuit 300 most relevant to the methods of the present disclosure is an electrical connection across which the resistance varies or is broken in relation to movement of a rocker arm 103.

Figure 9:
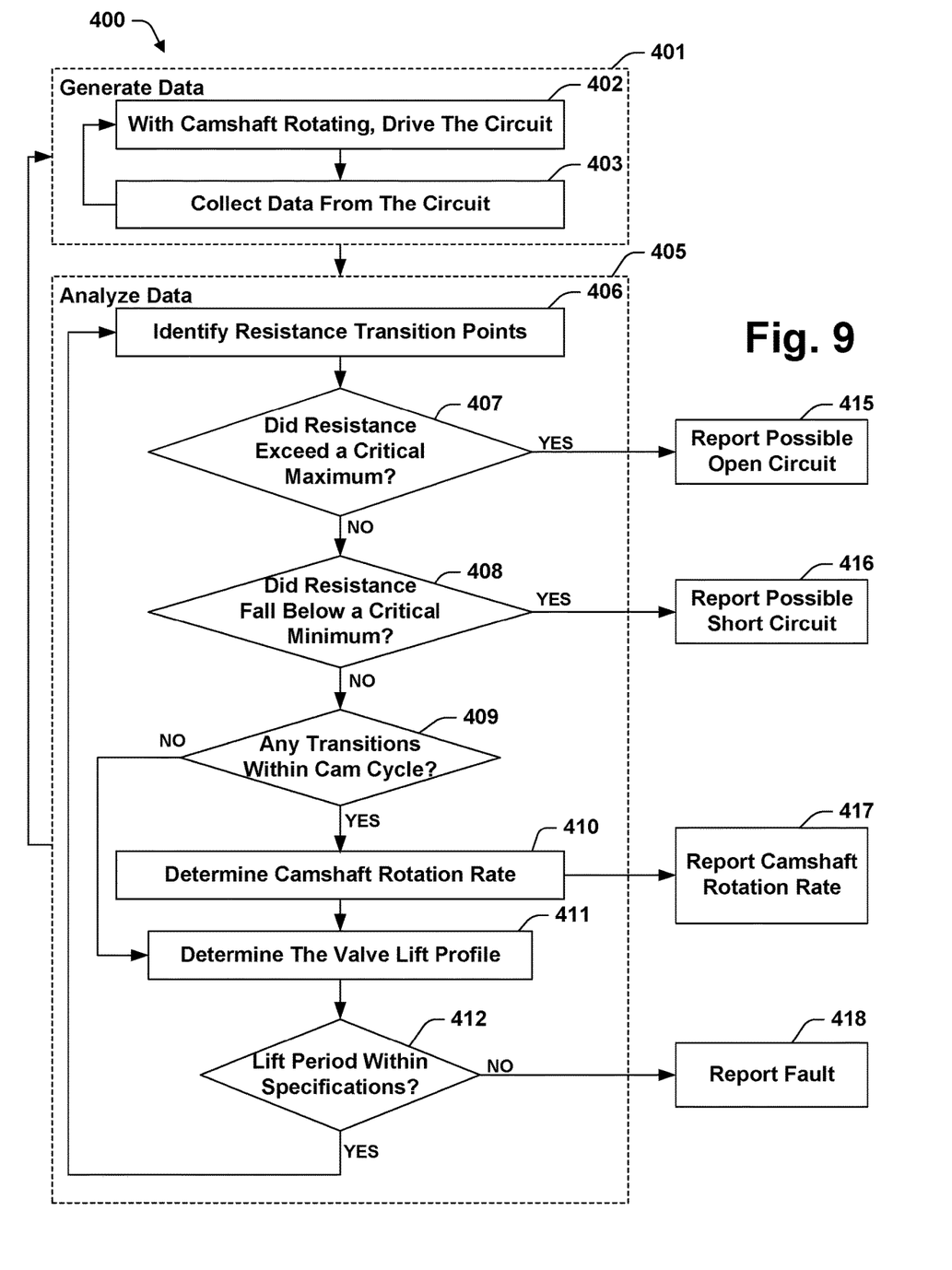
FIG. 9 is a flow chart of a method according to some aspects of the present teachings.

FIG. 9 provides a flow chart for a method 400 in accordance with the present teachings for operating an internal combustion engine that includes valvetrain 100. Method 400 includes two sets of actions that repeat and may continue concurrently. these are action 401, generating data, and action 405, analyzing the data. Generating data 401 includes action 402, which is driving circuit 300, and action 403, which is collecting data from circuit 300. Action 401 generally occurs independently of any command to actuate latch pin 117. Commands to actuate latch pin 117 may occur infrequently and are generally acted upon only when cams actuating rocker arm assembly 106 are on base circle. Actuation may be completed within a period on the order of 10 milliseconds. The actions of circuit driving 402 and data collection 403 may be suspended while a command to actuate latch pin 117 is being acted upon. Alternatively, data collection 402 may continue by taking into account the applied voltages and circuit dynamics associated with actuating latch pin 117.

Data collection 402 continues over a period. That period may be selected to span at least one camshaft revolution. Circuit 300 may be driven continuously over the period or in a series of pulses spanning the period. Circuit 300 is driven over the period in a manner that does not inadvertently actuate latch pin 117 or overheat electromagnet 119. Depending on the strategy for preventing latch actuation or overheating, circuit 300 may be driven using the illustrated components or additional components may be provided to drive circuit 300 in the desired manner.

In some of these teachings, circuit 300 is driven with a DC current for latch actuation but with an AC current for data collection. In some of these teachings, circuit 300 is driven with a DC current for data collection but with voltages too low to actuate latch pin 117. In some of these teachings, circuit 300 is driven with a DC current with the current sense (direction) selected to enhance retention of latch pin 117 in its current position. The current sense would be selected in relation to an assessment of the current position of latch pin 117. That assessment could be made based on the most recently executed command to actuate latch pin 117. In some of these teachings, circuit 300 is driven for data collection with pulses that are too short to individually actuate latch pin 117 and too widely spaced to collectively actuate latch pin 117. If the voltage applied for data collection is the same as the voltage applied to actuate latch pin 117, a suitable duty cycle is generally 50% or less.

Action 403 collects data from sensor 311 concurrently with driving circuit 300 through action 402. A voltage sensor may be used in place of a current sensor. Either current or voltage may be used as a proxy for, or a basis for determining, the resistance that is referenced in methods of the present disclosure. Data collection may be continuous or at a series of discrete points in time.

Method 400 continues with these series of actions 405 in which the data collected by actions 401 is analyzed. Actions 405 being with action 406, analyzing the data to identify points in time at which circuit 300 transitions from a first resistance range to a second resistance range, the second range consisting of values distinct from those in the first range. The transition between the first and second range may represent a transition of the circuit resistance between values above and values below a certain critical resistance. The transition between the first and second range may be characteristic of electrical connection 102A shifting between surface 105A and surface 105C. When connection 102A is closed through surface 105C, the resistance is typically one or two orders of magnitude higher than when connection 102A is closed through surface 105A.

Action 407 analyzes the data to determine whether the resistance exceeded a critical maximum. The critical maximum may represent a third range that includes resistance higher than any expected when connection 102A is closed through surface 105C. If the resistance exceeded the critical maximum, that may indicate an open circuit, which may be reported with action 415.

Action 408 analyzes the data to determine whether the resistance fell below a critical minimum. The critical minimum may represent another range that includes resistance lower than any expected when connection 102A is closed through surface 105A. If the resistance fell below the critical minimum, that may indicate a short circuit, which may be reported with action 416.

Action 409 determines whether any transitions were detected within a period spanning at least one cam cycle. The at least one cam cycle may include the most recent cam cycle. The determination that the period spans at least one cam cycle may be made based on an estimate of the camshaft rotation rate. The camshaft rotation rate may be estimated in any suitable manner. Options include estimating the rate from data obtained using camshaft position sensor data, estimating the rate from a recent application of the method of the present disclosure, or estimating the rate from any other suitable data that may be available to an engine central processing unit (CPU). Alternatively, the period over which data is analyzed may be set at a predetermined value that exceeds a maximum camshaft rotation period. If no transitions are identified, it may be concluded that outer arm 103A remained on base circle throughout the sample period.

If transitions are identified, the analysis may continue with action 410, determining the camshaft rotation rate. The camshaft rotation rate may be determined based on the elapsed time between consecutive transitions of one type. For example, the transitions may both be transitions from the first range to the second range or from the second range to the first. More than two periods between like transitions may be taken into consideration to provide a statistical determination of the rotation rate. Action 417 may then be taken, which reports the camshaft rotation rate. The camshaft rotation rate may be used to perform an engine management or control operation.

The analysis may continue with action 411, determining the valve lift profile. If no transitions were detected, it may be determined that the valve was either continuously closed or continuously open, depending on the resistance range. The former condition would be unusual and would generally represent a fault. The presence of just one transition would also generally represent a fault unless latch pin 117 was actuated during the sample period. If at least two transitions were detected, the valve lift profile may be determined based on the elapsed time between consecutive transitions of different types. For example, the first transition may be from the first range to the second and the second transition may be from the second range to the first. The period thus measured, considered in relation to the camshaft rotation rate, may be used to determine the fraction of a cam cycle that outer arm 103A is lifted beyond a certain degree. The camshaft rotation rate may be the one determined in action 409, or it may be a rate determined by some other means.

Method 400 continues with action 412, which determines whether the valve lift profile determined by action 411 is consistent with expectations. For example, action 412 may determine whether the valve lift profile is consistent with latch pin 117 being engaged or disengaged. If the valve lift profile is inconsistent with the one expected based on the most recent operation intended to actuate latch pin 117, it may be concluded that latch pin 117 is not in the expected position. If the valve lift profile is unexpectedly short, the data may be further analyzed to determine whether it is consistent with lath pin 117 having slipped out of engagement while outer arm 103A was being lifted. The data may also be used to detect wear in rocker arm assembly 106, or any other problem that would affect the valve lift profile. Any problems that are detected may be reported with action 418. The report may include sending a signal, such as illuminating a warning light. In some of these teachings, reporting 418 includes recording a diagnostic code in a data storage device. The diagnostic code may later be read by a technician.

In some of these teachings, method 400 provides data that is used in an engine management operation. An engine management operation is one that affects a running state of an engine in which valvetrain 100 is installed. The data may be a camshaft rotation rate reported by action 417. Alternatively, of in addition, the data may include a camshaft position, which may be determined from one of the transitions detected with action 406. Method 400 may determine camshaft position with greater accuracy or reliability by combining the data with similar data obtained from a second circuit 300 associated with a distinct rocker arm assembly 106. Camshaft position information may be used in the same way as information from a conventional camshaft position sensor. For example, the information may be used to determine the timing of an ignition or a fueling event.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A method of operating an internal combustion engine of a type that has a combustion chamber, a moveable valve having a seat formed in the combustion chamber, a camshaft, and a rocker arm assembly that actuates the moveable valve and includes a rocker arm and a cam follower configured to engage a cam mounted on the camshaft as the camshaft rotates, the method comprising:

providing an electrical circuit having a resistance and comprising an electrical connection made by physical contact between two distinct parts, one of which is mounted to the rocker arm and a second of which is mounted to a part distinct from the rocker arm assembly;

over an interval, determining zero, one, or more timings that correspond to any transitions of the resistance between a first range and a second range; and performing a diagnostic or a control operation based on the timings or an absence of any transitions;

wherein a motion between the two distinct parts that may be driven by the camshaft causes the resistance to transition between the first range and the second range.

2. The method of claim 1, comprising using at least one of the timings in the diagnostic or the control operation.

3. The method of claim 2, wherein the diagnostic or control operation is performed based on a difference between two of the timings.

4. The method of claim 3, wherein:
the resistance transitions from the first range to the second range at a first of the two of the timings; and
the resistance transitions from the second range to the first range at a second of the two of the timings.

5. The method of claim 4, wherein the internal combustion engine further comprises an electromagnetic latch assembly comprising an electromagnet powered through the electrical circuit.

6. The method of claim 3, further comprising using the difference to assess a valve lift profile being imparted by the rocker arm assembly to the moveable valve.

7. The method of claim 3, wherein
the resistance transitions from the first range to the second range at each of the two of the timings.

8. The method of claim 7, further comprising using the difference to determine a camshaft rotation rate.

9. The method of claim 3, wherein the internal combustion engine further comprises an electromagnetic latch assembly comprising an electromagnet powered through the electrical circuit.

10. The method of claim 1, wherein the internal combustion engine further comprises an electromagnetic latch assembly comprising an electromagnet powered through the electrical circuit.

11. The method of claim 10, wherein:
the electromagnetic latch assembly includes a latch pin translatable between a first position and a second position;
the first position makes the rocker arm assembly is operative to actuate the moveable valve in response to actuation of the cam follower by the cam to produce a first valve lift profile;
the second position makes the rocker arm assembly is operative to actuate the moveable valve in response to actuation of the cam follower to produce a second valve lift profile, which is distinct from the first valve lift profile, or the moveable valve is deactivated; and
the electromagnetic latch assembly renders the latch pin stable independently from the electromagnet in both the first position and the second position.

12. The method of claim 11, wherein the electromagnet is grounded through a structure of the rocker arm assembly.

13. The method of claim 11, wherein two or more of the timings are determined over a single period over which the electromagnet is powered with a current 50% or less a current required to actuate the latch pin.

14. The method of claim 11, further comprising pulsing the electrical circuit to measure the resistance.

15. A method of operating an internal combustion engine of a type that has a combustion chamber, a moveable valve having a seat formed in the combustion chamber, a camshaft, and a rocker arm assembly that actuates the moveable valve and includes a rocker arm and a cam follower configured to engage a cam mounted on the camshaft as the camshaft rotates, the method comprising:
providing an electrical circuit having a resistance and comprising an electrical connection made by physical contact between two distinct parts, one of which is mounted to the rocker arm;
over an interval, determining zero, one, or more timings that correspond to any transitions of the resistance between a first range and a second range;
performing a diagnostic or a control operation based on the timings or an absence of any transitions; and
causing a location on one of the two distinct parts at which the physical contact occurs to shift by rotating the camshaft;
wherein the shift causes at least one of the transitions without breaking the physical contact between the two distinct parts.

16. The method of claim 15, wherein one of the two distinct parts is partially covered with a coating that causes the at least one of the transitions.

17. The method of claim 16, wherein the coating comprises diamond-like carbon.

18. The method of claim 15, wherein the internal combustion engine further comprises an electromagnetic latch assembly comprising an electromagnet powered through the electrical circuit.

19. The method of claim 15, wherein a second of the two distinct parts is mounted to a part distinct from the rocker arm assembly.

20. A method of operating an internal combustion engine of a type that has a combustion chamber, a moveable valve having a seat formed in the combustion chamber, a camshaft, and a rocker arm assembly that actuates the moveable valve and includes a rocker arm and a cam follower configured to engage a cam mounted on the camshaft as the camshaft rotates, the method comprising:
providing an electrical circuit having a resistance and comprising an electrical connection made by physical contact between two distinct parts, one of which is mounted to the rocker arm;
over an interval, determining zero, one, or more timings that correspond to any transitions of the resistance between a first range and a second range; and
performing a diagnostic or a control operation based on the timings or an absence of any transitions;
wherein a second of the two distinct parts is mounted to a part distinct from the rocker arm assembly.

* * * * *